(12) United States Patent
Robbin et al.

(10) Patent No.: US 7,689,920 B2
(45) Date of Patent: Mar. 30, 2010

(54) PARENTAL CONTROL GRAPHICAL USER INTERFACE

(75) Inventors: Jeffrey L. Robbin, Los Altos, CA (US); David Heller, San Jose, CA (US); Jeff Miller, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 245 days.

(21) Appl. No.: 11/221,351

(22) Filed: Sep. 6, 2005

(65) Prior Publication Data

US 2007/0055754 A1    Mar. 8, 2007

(51) Int. Cl.
G06F 3/00 (2006.01)
(52) U.S. Cl. .................. 715/741; 715/743; 715/716
(58) Field of Classification Search ............... 715/741, 715/716, 743; 348/14.03
See application file for complete search history.

(56) References Cited

U.S. PATENT DOCUMENTS

| | | | |
|---|---|---|---|
| 5,485,518 A | | 1/1996 | Hunter et al. |
| 5,745,714 A | * | 4/1998 | Glass et al. ............... 715/788 |
| 5,933,136 A | * | 8/1999 | Brown ..................... 715/741 |
| 5,978,920 A | | 11/1999 | Lee |
| 6,020,882 A | * | 2/2000 | Kinghorn et al. ............ 715/716 |
| 6,038,551 A | * | 3/2000 | Barlow et al. ............... 705/41 |
| 6,363,434 B1 | * | 3/2002 | Eytchison ................. 719/313 |
| 6,400,996 B1 | | 6/2002 | Hoffberg et al. |
| 6,519,412 B1 | * | 2/2003 | Kim ......................... 386/94 |
| 6,567,979 B1 | | 5/2003 | deCarmo |
| 6,637,027 B1 | * | 10/2003 | Breslauer et al. ........... 725/25 |
| 6,662,365 B1 | * | 12/2003 | Sullivan et al. ............ 725/25 |
| 6,701,523 B1 | * | 3/2004 | Hancock et al. ............ 725/25 |
| 6,722,984 B1 | | 4/2004 | Sweeney, Jr. et al. |
| 6,850,252 B1 | | 2/2005 | Hoffberg |
| 7,046,139 B2 | | 5/2006 | Kuhn et al. |
| 7,100,053 B1 | | 8/2006 | Brown et al. |
| 7,124,938 B1 | | 10/2006 | Marsh |
| 7,370,208 B2 | | 5/2008 | Levin et al. |
| 2002/0013941 A1 | * | 1/2002 | Ward et al. .................. 725/25 |
| 2002/0016962 A1 | * | 2/2002 | Decarmo .................... 725/28 |
| 2002/0049806 A1 | * | 4/2002 | Gatz et al. ................. 709/203 |
| 2002/0128061 A1 | * | 9/2002 | Blanco ...................... 463/29 |
| 2002/0178277 A1 | * | 11/2002 | Laksono .................... 709/231 |
| 2003/0163724 A1 | * | 8/2003 | Tayebi et al. ............... 713/200 |
| 2003/0163811 A1 | * | 8/2003 | Luehrs ...................... 725/25 |
| 2003/0233651 A1 | | 12/2003 | Farley et al. |
| 2004/0003279 A1 | * | 1/2004 | Beilinson et al. ........... 713/200 |
| 2004/0040034 A1 | * | 2/2004 | Sullivan et al. ............. 725/25 |
| 2004/0078806 A1 | * | 4/2004 | Johnson et al. ............. 725/9 |
| 2004/0205334 A1 | * | 10/2004 | Rennels .................... 713/154 |
| 2004/0260801 A1 | | 12/2004 | Li |
| 2004/0268451 A1 | | 12/2004 | Robbin et al. |
| 2005/0021478 A1 | * | 1/2005 | Gautier et al. .............. 705/65 |
| 2005/0028191 A1 | * | 2/2005 | Sullivan et al. ............. 725/28 |

(Continued)

OTHER PUBLICATIONS

Hinson, Byron, ActiveMac: MacOS 10.3 or Windows XP, Nov. 2, 2003 as found http://www.activewin.com/mac/articles/2003/8.shtml.*

(Continued)

*Primary Examiner*—Boris Pesin

(57) ABSTRACT

Improved graphical user interfaces suitable for restricting the availability of media items and/or podcasts are also disclosed. The graphical user interfaces are particularly useful for a system that provides purchase and distribution of media in a client-server environment.

23 Claims, 4 Drawing Sheets

U.S. PATENT DOCUMENTS

| | | | |
|---|---|---|---|
| 2005/0050345 A1* | 3/2005 | Dowdy et al. | 713/193 |
| 2005/0081043 A1* | 4/2005 | Evans et al. | 713/182 |
| 2005/0097595 A1* | 5/2005 | Lipsanen et al. | 725/25 |
| 2005/0125822 A1* | 6/2005 | Casement et al. | 725/30 |
| 2005/0203959 A1* | 9/2005 | Muller et al. | 707/104.1 |
| 2005/0240959 A1* | 10/2005 | Kuhn et al. | 725/25 |
| 2005/0240960 A1* | 10/2005 | Nagtzaam | 725/28 |
| 2005/0251827 A1* | 11/2005 | Ellis et al. | 725/47 |
| 2006/0107304 A1 | 5/2006 | Cleron et al. | |
| 2006/0136964 A1* | 6/2006 | Diez et al. | 725/37 |
| 2006/0161668 A1 | 7/2006 | Mathew et al. | |
| 2006/0218575 A1* | 9/2006 | Blair | 725/28 |
| 2006/0277564 A1* | 12/2006 | Jarman | 725/25 |
| 2007/0013515 A1* | 1/2007 | Johnson et al. | 340/568.1 |
| 2007/0016870 A1* | 1/2007 | Doerr et al. | 715/764 |
| 2007/0245398 A1 | 10/2007 | Roden | |
| 2007/0288616 A1 | 12/2007 | Hewit et al. | |
| 2008/0196055 A1 | 8/2008 | Sandoval et al. | |

OTHER PUBLICATIONS

U.S. Robotics, USR8200 Firewall/VPN/NAS User Guide, Oct. 30, 2004 as found http://web.archive.org/web/20041030084809/http://www.usr.com/support/8200/8200-ug/twelve.html.*

Landsman, Ian, Secure RSS Feeds, Jan. 20, 2005 as found http://www.userscape.com/blog/index.php/weblog/archives/2005/01/.*

CYBERsitter, Using CYBERsitter 2002, 2004 as found http://www.pathwayschools.org/pdf/cybersitter.pdf.*

MIT, Tech Tip: Mac OS X 10.3, Mar./Apr. 2004 as found http://web.mit.edu/ist/isnews/v19/n04/190406.html.*

Tetrault, Gregory, Review: Kids GoGoGo 6.2 Feb. 3, 2004 as found http://www.atpm.com/8.12/kids-gogogo.shtml.*

"The TV Parental Guidelines-Frequently Asked Questions", www.tvguidelines.org/faqs.asp, downloaded Apr. 30, 2007, pp. 1-2.

"Symantec announces Norton Internet Security 3.0", MacMinute News, www.macminute.com/2003/05/13/symantec, downloaded Apr. 30, 2007, pp. 1-2.

* cited by examiner

PARENTAL CONTROL GRAPHICAL USER INTERFACE

CROSS-REFERENCE TO RELATED APPLICATIONS

This application is related to: (i) U.S. patent application Ser. No. 10/832,984, entitled "GRAPHICAL USER INTERFACE FOR BROWSING, SEARCHING AND PRESENTING MEDIA ITEMS" by Robbins, et al. filed on Apr. 26, 2004, which is hereby incorporated by reference herein.

BACKGROUND OF THE INVENTION

1. Field of the Invention

The present invention relates to media purchase and distribution and, more particularly, to selectively proscribing the purchase or viewing of selected media items and/or the distribution of certain proscribed podcasts in a client-server environment.

2. Description of the Related Art

Traditionally, music has been purchased at music stores or music departments of larger stores. A consumer will visit the music store or department and manually browse for albums or compact discs (CDs) of interest. Often, the music in the music store or department is categorized by genre, and then indexed by artist. For example, genre can include rock, country, pop, soul, jazz, etc. After the consumer selects an album or CD of interest, the consumer proceeds to a check-out register to pay for the album or CD being purchased.

In recent years music delivery or distribution over the Internet has become popular. Due to the advances in efficient file formats, such as MP3 and MPEG4, the size of media files have become small enough to make their download via the Internet practical. Also, technological advances have led to higher-speed Internet connections and lower cost of memory. The combination of these advances make downloading media files, such as for music and videos, manageable and not too time consuming.

One popular approach to music distribution was mp3.com which uses a centralized server for storage of the numerous songs that are available for download. Another popular approach to music distribution was Napster in which peer-to-peer sharing was utilized. With peer-to-peer sharing, the numerous songs reside on the user machines of the many users, not on a centralized server.

In addition to music distribution, the publishing of audio broadcasts over the Internet (commonly referred to as Podcasting) has become a significant. Podcasting is a method of publishing audio broadcasts via the Internet, allowing users to subscribe to a feed of new files (usually MP3s) that became popular in late 2004, largely due to automatic downloading of audio onto portable media players or personal computers.

Podcasting is very distinct from other types of online media delivery because of its subscription model, which uses a feed such as Rich Site Summary (RSS). RSS is a family of XML file formats for web syndication used by (amongst other things) news websites and weblogs to deliver an enclosed file. To use RSS, some type of aggregation service (akin to a personal mailbox) must be established in addition to subscribe to the sites that one want to get updates on. However, unlike conventional subscriptions to pulp-based newspapers and magazines, RSS subscriptions are generally free and typically only give you a line or two of each article or post along with a link to the full article or post.

By establishing a personal aggregator and a corresponding subscription, a user can select which type and kind of podcasts are to be received. In addition to greatly enhancing an individual's choice of information, Podcasting enables independent producers to create self-published, syndicated "radio shows," and gives broadcast radio programs a new distribution method. Listeners may subscribe to feeds using "podcatching" software (a type of aggregator), which periodically checks for and downloads new content automatically. Some podcatching software is also able to synchronise (copy) podcasts to portable music players. Any digital audio player or computer with audio-playing software can play podcasts. The same technique can deliver video files as well as audio.

Unfortunately, however, some content available as either a Podcast or for online purchase may not be deemed suitable for certain groups of people, such as children. In these situations, a parent (or other such content guardian) may want to restrict the availability of certain material based upon sexual content, violence, profanity, unwanted political views, etc.

As a result, there is a need to permit restrict the availability of certain content otherwise freely available.

SUMMARY OF THE INVENTION

Broadly speaking, the invention relates a graphical user interface suitable for providing parental control in the access of online music store and for the receipt of any podcasts otherwise freely available. The graphical user interface can be presented to a user at a client (client machine). In one embodiment, the graphical user interface is presented to the user by an application program that runs on the client.

The invention can be implemented in numerous ways, including as a method, system, device, apparatus, graphical user interface, or computer readable medium. Several embodiments of the invention are discussed below.

The graphical user interface is particularly useful for a system that provides purchase and distribution of media in a client-server environment. The graphical user interface produced by an application program includes an application program window generated by the application program, said application program window concurrently including at least a first sub-window and a second sub-window. The first sub-window displays a list of selectable program utility items further including a selectable parental control item, and the second sub-window displays a list of selectable items available for restriction and a selectable locking item for disabling unauthorized access to the list of selectable items available for restriction.

Another embodiment describes a method for restricting access of a client device to a remote server that method includes the following operations. Requesting first selectable items for a list of selectable program utility items having a selectable parental control item from the remote server, displaying a first browse window with the list of selectable program utility items, receiving a first user selection of one of the selectable parental control item, distinctively displaying in a second browse window a list of selectable items available for restriction and a selectable locking item for disabling unauthorized access to the list of selectable items available for restriction based upon the selection of the parental control item by the user, receiving a second user selection of one of the list of selectable items available for restriction, distinctively displaying the one of the second selectable items in the second list that the user has selected, receiving a third user selection of the selectable locking item, requesting a disable second browse window command from the remote server that includes a locked icon, and displaying the first browse window with the first list of the first selectable items, the second browse window with the list of selectable items available for restriction that cannot be accessed, and the accessible locked icon.

In yet another embodiment, computer program product for restricting access of a client device to a remote server is disclosed.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Figure 1:
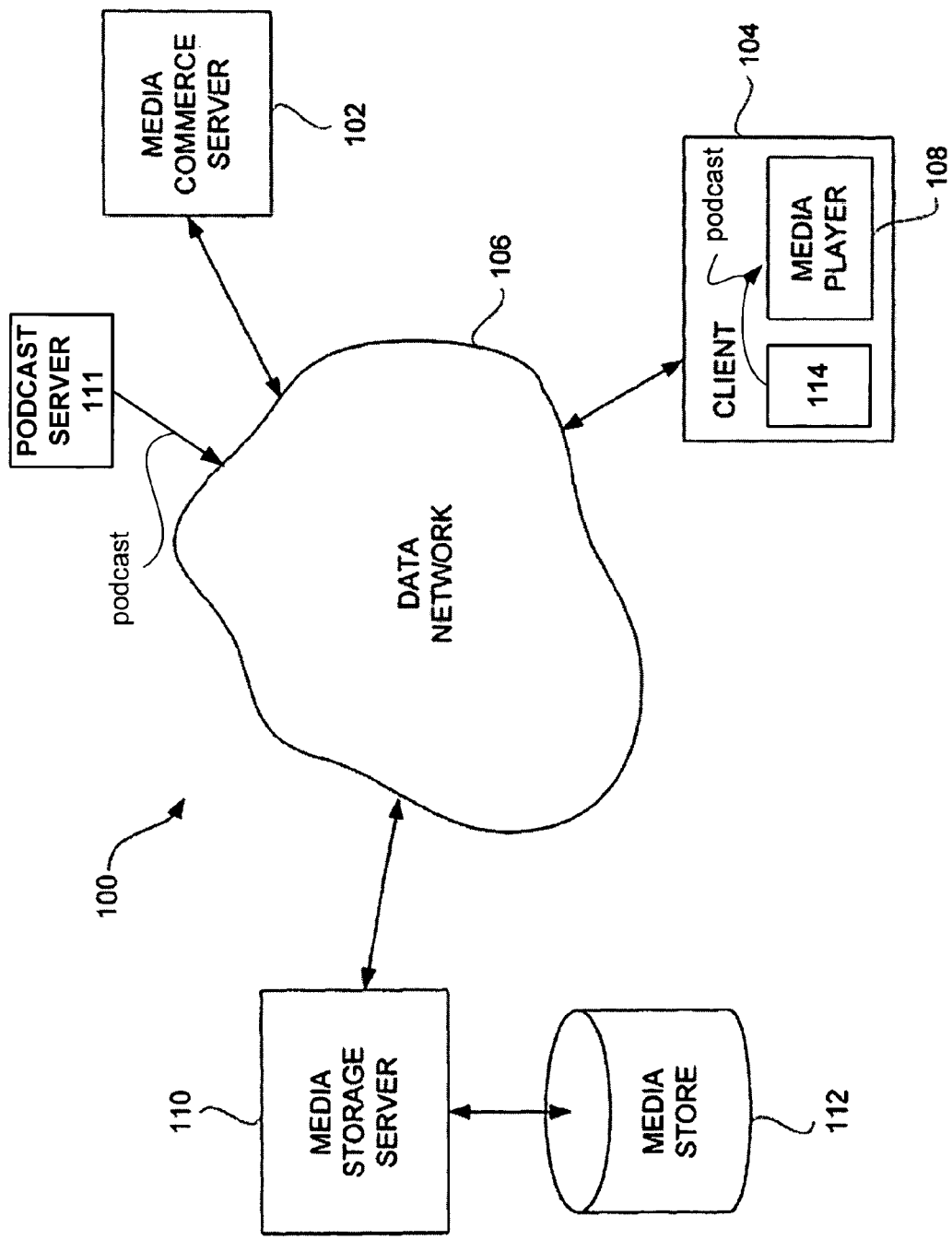
FIG. 1 is a block diagram of a media purchase system according to one embodiment of the invention.

The invention relates a graphical user interface suitable for reviewing, browsing, previewing and/or purchasing media items as well as providing a parental control function for selectively limiting access to specific media items based upon, for example, explicit sexual content, violence, political views, etc. The graphical user interface also provides for restricting podcast subscriptions based upon pre-selected criteria. The graphical user interface can be presented to a user at a client (client machine). In one embodiment, the graphical user interface is presented to the user by an application program that runs on the client. By selecting certain restrictions, a client is then unable to view media items available in a media item store (such as online music store) or receive restricted podcasts from a podcast server.

The graphical user interface is particularly useful for a system that provides purchase and/or distribution of media in a client-server environment. The purchase and distribution of media cannot only be secure but also controlled. The controlled distribution can use encryption and user accounts to not only restrict unauthorized access to the media but also to limit usage rights to the media by authorized users as well. The security restricts access to media within media files during downloads as well as while stored at a server and/or client. The graphical user interface can assist users in locating media to be purchased. The media can, for example, be audio, video, or image data.

Embodiments of various aspects of the invention are discussed below with reference to FIGS. 1-3A and 3B. However, those skilled in the art will readily appreciate that the detailed description given herein with respect to these figures is for explanatory purposes as the invention extends beyond these limited embodiments.

One aspect of the invention pertains to a system and method for restricting the available media items available for purchasing over a network. A content guardian (such as a parent or loco parentis) can restrict the media items available that a potential purchaser can search and browse though numerous other unrestricted media items are still available for purchase. In the described embodiment, a tag is associated with those media content determined to be explicit (language, sexual content, etc.) in nature and therefore a potential candidate for parental restriction. In some cases, a parent, for example, can specify particular media items by genre, artist, song, etc. that should not be readily viewable or available except when specifically requested using another unrestricted account. It should be noted, however, that the restriction of certain media items in no way affects the viewing and purchase of unrestricted items since a potential purchaser can purchase the unrestricted media items with great ease. Upon purchasing a media item, the content for the media item can be downloaded over the network to the purchaser. The content for the media item is then encrypted for the purchaser's use and stored on the purchaser's machine. Thereafter, the purchaser can make use of the media item (e.g., play the media item). However, the use of the media item can still be limited.

In addition to restricting the purchase of certain media items, certain podcasts (either subscription or non-subscription based) can also be restricted by the content guardian. As with the restriction of media items, an explicit tag is associated with those podcasts deemed to be potentially offensive and are therefore candidates for potential restriction by a parent or other guardian. In some cases, the parent can specify those podcasts that are to be restricted by either podcaster identification or podcast content. Typically, all existing podcast subscriptions remain unaffected (unless specifically restricted out) and only those new subscriptions having an explicit tag associated therewith are affected. In some cases, however, a parent may desire that all podcasts be restricted including any existing subscriptions as well as any freely published subscriptions. In this case, no podcasts can be received by the aggregator until directed otherwise.

FIG. 1 is a block diagram of a media purchase system 100 according to one embodiment of the invention. The media purchase system 100 includes a media commerce server 102. The media commerce server 102 coordinates review and/or purchase of media items through on-line transactions. On-line transactions to purchase media items is also referred to as electronic commerce (e-commerce). The media purchase system 100 also includes a client 104. Typically, the media purchase system 100 would include a plurality of different clients 104. Each client 104 includes a media player 108 and an aggregator 109. The media player 108 is an application program (e.g., software application) that operates on the client 104, which is a computing device. The aggregator 109 (sometimes referred to as "podcatching" software) allows listeners to subscribe to podcast feeds from a podcast server (publisher) 111 as an either freely published or subscription based publication. In the described embodiment, the aggregator 109 periodically checks for and downloads new content automatically from the publisher 111. Some podcatching software is also able to synchronize (copy) podcasts to portable music players such as the media player 108 since any digital audio player or computer with audio-playing software can play podcasts as well as video.

The client 104 is coupled to the media commerce server 102 through a data network 106. Hence, any of the clients 104 can interact with the media commerce server 102 to review and/or purchase unrestricted media items. In one embodiment, the data network 106 includes at least a portion of the Internet. The clients 104 can vary with application but generally are computing devices that have memory storage. Often, the clients 104 are personal computers or other computing devices that are capable of storing and presenting media to their users.

The media purchase system 100 also includes a media storage server 110 and a media store 112. The media storage server 110 represents a remote storage server that couples to the data network 106. The media store 112 provides mass storage of the numerous media items that are available for purchase via the media purchase system 100. Once purchased, the media items can be accessed from the media store 112 over the data network 106 by way of the media storage server 110.

More particularly, the media purchase system 100 allows a user of the client 104 to utilize the media player 108 to browse, search or sort through a plurality of unrestricted media items that can be purchased from the media commerce server 102. The media player 108 may also allow the user to preview a media clip of the unrestricted media items. In the event that the user of the media player 108 desires to purchase a particular unrestricted media item, the user (via the media player 108) and the media commerce server 102 engage in an on-line commerce transaction in which the user pays for access rights to the particular media item. In one embodiment, a credit card associated with the user is credited for the purchase amount of the particular media item.

In the media purchase system 100 shown in FIG. 1, all the media items are stored in the media store 112 and only the unrestricted items are retrieved via the media storage server 110. Hence, the media commerce server 102 need not burden its resources to deliver any of the media items that may be purchased to the client 104. Instead, on purchasing a particular media item, the media commerce server 102 sends download information to the media player 108 on the client 104. The download information can then be used by the media player 108 (and the client 104) to retrieve the media content for the particular media item by interacting with the media storage server 110 through the data network 106. In this regard, the media storage server 110 obtains the media content corresponding to the particular media item from the media store 112 and downloads such content through the data network 106 to the client 104. The downloaded media content can then be stored on the client 104. In one embodiment, the downloaded media content is stored on the client 104 as received. In another embodiment, the downloaded media content is transcrypted from one encryption key to another encryption key before persistent storage on the client 104. In still another embodiment, the downloaded media content is encrypted as received at the client 104 but is decrypted and then re-encrypted before persistent storage on the client 104. Thereafter, the media player 108 can present (e.g., play) the media content at the client 104.

The connections through the data network 106 between the media commerce server 102, the client 104 and the media storage server 110 can be through secure connections, such as Secure Sockets Layer (SSL). Further, the media content is stored at the client 104 in an encrypted manner.

As discussed in greater detail below, the media player 108 can utilize an improved graphical user interface. More particularly, in one embodiment, a window presented on a display device of the client 104, when executing the media player 108, includes an upper window that displays content provided by the media commerce server 102 in a browser-like manner, and a lower window displays unrestricted content provided by the media commerce server 102 in a typical media player-like manner. In another embodiment, a window presented on a display device of the client 104, when executing the media player 108, includes an upper window that displays a multi-tier browse interface that implements a browse function with respect to the unrestricted media items through interaction with the media commerce server 102.

Figure 2:
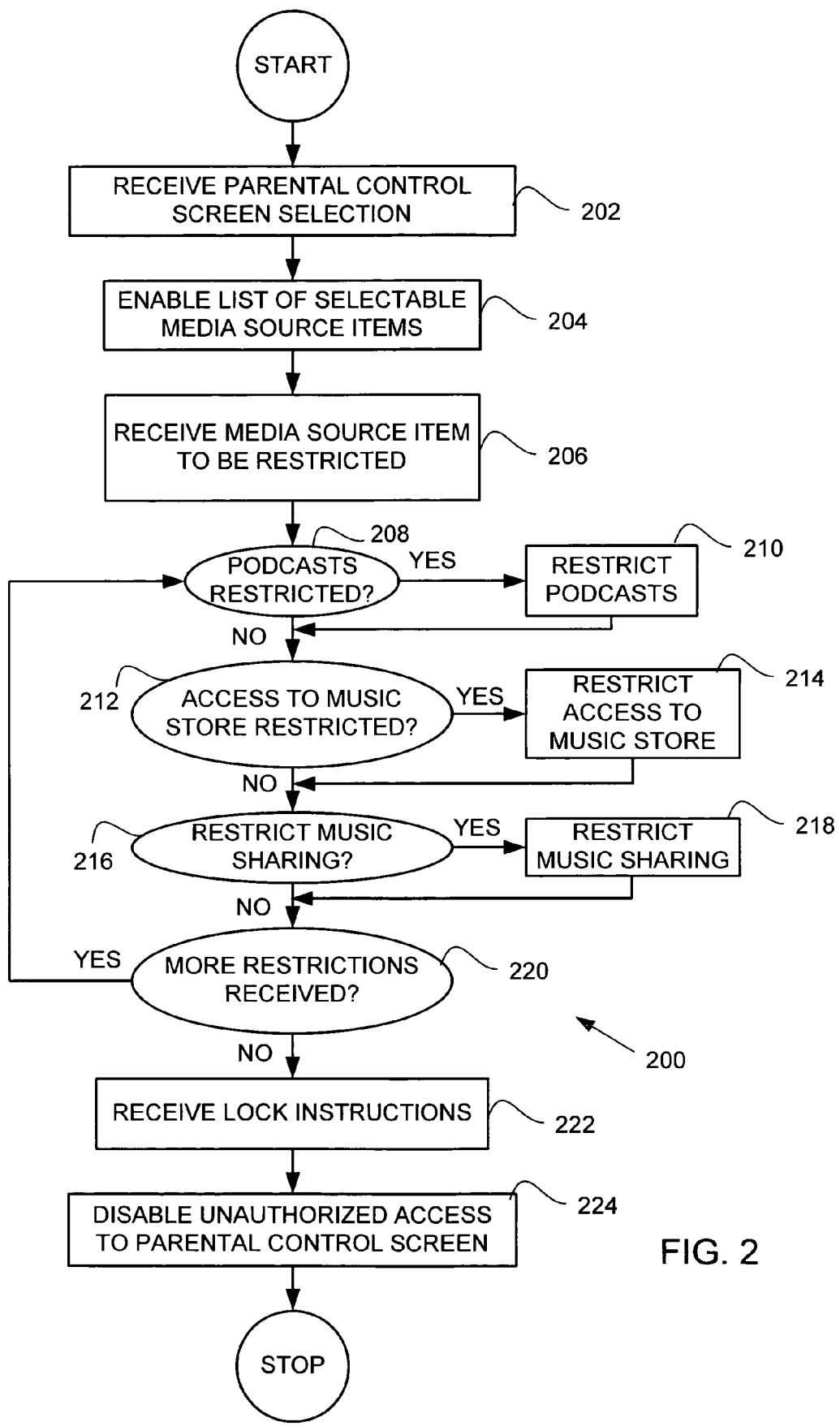
FIG. 2 is a flow diagram of restricting either media purchase processing or receiving of podcasts according to one embodiment of the invention.

FIG. 2 is a flow diagram of providing parental controls processing 200 according to one embodiment of the invention. The providing parental controls processing 200 is, for example, processing associated with a media player of a media purchase system or a podcast aggregator each of which is resident on a client device. The media player and aggregator can, for example, be the media player 108 and the aggregator 109 operating on the client 104 illustrated in FIG. 1.

The providing parental controls processing 200 initially permits a user (parent, for example) to enable a parental control screen 202 that in turn, enables a list of selectable media source items 204. The media source list includes general class of media and media actions available for restriction such as podcasts, access to the music store, and the ability to share music (or video) files between any computers. At 206, a media source item to be restricted is identified and at 208 a determination is made whether or not the identified media source item is a podcast. If the identified media source item is a podcast, then at 210, podcasts are restricted. It should be noted that optionally all podcasts can be restricted or only certain podcasts can be restricted such as only new podcast subscriptions are restricted, or only specifically identified podcasts are restricted, or only those podcasts determined to be explicit in nature (based upon a predetermined criteria) are restricted, or any combination thereof. If, at 212, access to the music store is restricted, then at 214, access to the music store is restricted in to (i.e., the music store can not be viewed by anyone using the client 104). If, at 216, music sharing is restricted, then at 218, all music sharing is restricted. It should be noted that in some cases, total access to the music store is not restricted, however, certain music store media items can be restricted (and therefore unviewable and unpurchaseable) based upon a number of criteria, such as being explicitly tagged as explicit, specifically identified artists, genres, etc. In this case, only unrestricted music store content is both viewable and purchasable. Once all restrictions have been made at 220, the selected restrictions are locked at 222 and the parental control screen is then disabled until subsequently unlocked by an authorized user at 224.

Figure 3A:
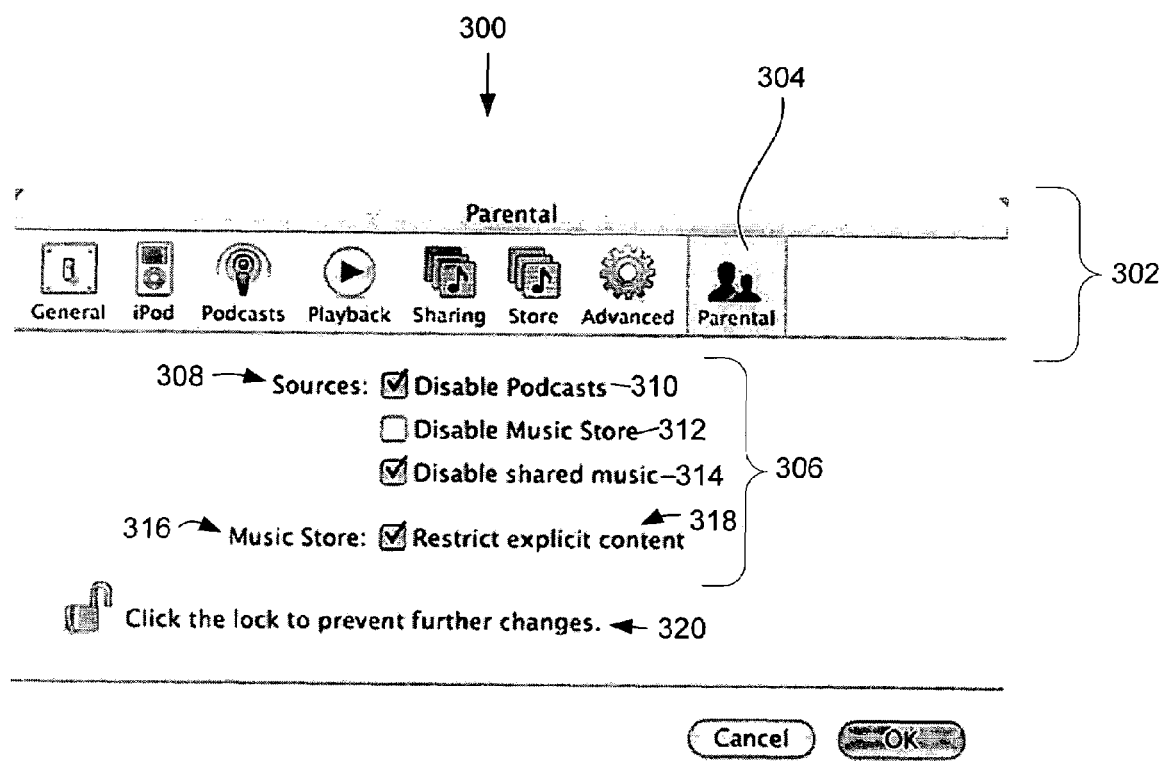
FIGS. 3A and 3B are screen shots of a representative application program window displayed on, for example, the client according to one embodiment of the invention.

FIG. 3A is a screen shot of a representative application program window 300 displayed on, for example, the client 104 according to one embodiment of the invention. The window 300 includes a menu bar 302 that includes a number of selectable menu items that includes, amongst others, a parental control item 304 used to enable a number of available parental controls. When the parental control item 304 is selected, a list of selectable parental control items 306 are made available for selection. As shown in FIG. 3A, the parental control items 306 include a sources list icon 308 for selectively disabling the viewing or selection of an entire class of source material. For example, a disable podcast item 310 selectively disables the receipt of all podcasts. In some cases, however, a second option (along the lines of the more detailed music store restriction item discussed below) provides for restricting only new podcast subscriptions or only those podcasts having an explicit tag associated therewith or in some cases, specifically identified podcasts which may or may not have an explicit tag associated therewith.

The parental control items also includes a disable music store item 312 for disabling access to or viewing or purchase of any media item available in the music store 112, and a disable shared music item 314 for disabling any music sharing protocols between, for example, local computers or more extensive peer to peer sharing over an extended number of computers. When access to the music store is desired, but only specific music store items are to be restricted, a music store content restriction icon 316 provides a restrict explicit content item 318 for restricting any music store item having an explicit tag associated therewith, or specifically identified music store item (genre, artist, title, etc.)

Figure 3B:
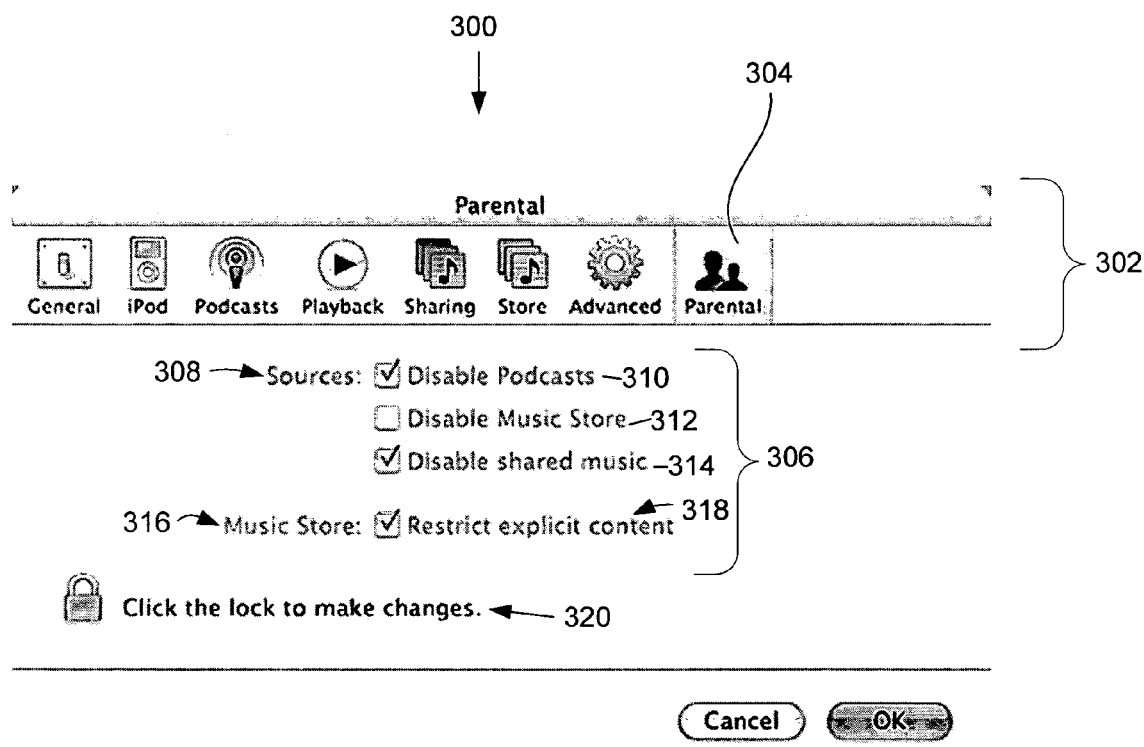

Once a parent has completed the desired restrictions, a locking mechanism shown as a lock icon 320 provides for locking in the current settings as shown in FIG. 3B. Once the lock has been set, the parental control icons 304 return to the grayed out and therefore unavailable status until a password is entered which, in turn, opens the lock and returns the window to the previous unlocked state shown in FIG. 3A.

The various aspects, features, embodiments or implementations of the invention described above can be used alone or in various combinations.

The media items can pertain to audio items (e.g., audio files or songs, such as for music or audio books), video items (e.g., video files or movies), or image items (e.g., photos).

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The advantages of the invention are numerous. Different embodiments or implementations may, but need not, yield one or more of the following advantages. One advantage of the invention is that purchased media items can be securely downloaded to a user's machine. Another advantage of the invention is that media items can be purchased with a single user interface action. Still another advantage of the invention is that media items available for purchase can be searched or browsed in an efficient, user-friendly manner. Yet another advantage of the invention is that media items having offensive content or decriptors can be distinguishably displayed and/or altered to signal the presence of or remove of the offensive matter.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A client computing device adapted to execute an application program that presents a graphical user interface on a display device of the client computing device, the application program having capability to subscribe to, receive and playback media content from a plurality of media sources, said graphical user interface comprising:
    an application program window generated by the application program, said application program window presents user-selectable parental controls, said application program window concurrently including at least:
        a list of selectable program utility items including at least a selectable parental utility item,
        a list of selectable parental control items available to configure disablement of media sources, and
        a selectable locking item for disabling unauthorized access to the list of selectable parental control items,
    wherein the list of selectable parental control items includes a plurality of selectable media source items for selectively disabling any of a plurality of media sources, and
    wherein the plurality of selectable media source items includes at least a disable podcast selectable item for selectively disabling reception of podcasts, and a disable music store selectable item for disabling access to or viewing of an online music store.

2. A client computing device as recited in claim 1,
    wherein said application program window displays one or more podcasts that have been received at the client device or are available to be received at the client device, and
    wherein if the disable podcast selectable item is selected, the one or more podcasts are hidden and not display by said application program window.

3. A client computing device as recited in claim 1, wherein the plurality of selectable media source items further includes a disable shared music selectable item for disabling sharing of music files between computers.

4. A client computing device as recited in claim 1, wherein the selectable locking item, when selected, disables access to the list of selectable parental control items.

5. A client computing device as recited in claim 4, wherein when the list of selectable parental control items is disabled, then the list of selectable parental control items is visible but grayed out.

6. A client computing device as recited in claim 4, wherein an authorized user can thereafter unlock the list of selectable parental control items using a password, thereby enabling access to the list of selectable parental control items.

7. A client computing device as recited in claim 1, wherein the restrictions apply to the client device, and wherein the list of selectable parental control items is further available to configure restriction of media content.

8. A method for implementing parental controls using an application program operating on a client device, the application program having capability to receive and playback media content from a plurality of media sources, said method comprising:
    displaying a list of selectable program utility items having a selectable parental control item;
    receiving a first user selection of the selectable parental control item;
    displaying, in response to the first user selection, a list of selectable items available for restriction, wherein a plurality of the selectable items in the list of selectable items available for restriction correspond to different media sources;
    displaying a selectable locking item for disabling unauthorized access to the list of selectable items available for restriction;
    receiving a second user selection of one of the list of selectable items available for restriction;
    distinctively displaying the one of the selectable items in the list of selectable items available for restriction that the user has selected via the second user selection;
    receiving a third user selection of the selectable locking item;
    displaying the list of the first selectable items with the list of selectable items available for restriction being locked in response to the third user selection,
    wherein the list of selectable items available for restriction includes one or more restrict sources selectable items for selectively disabling any of a plurality of media sources, and wherein the restrict sources selectable items include at least a disable podcast selectable item for selectively disabling access to podcasts, and a disable music store selectable item for disabling access to or viewing of an online music store.

9. A method as recited in claim 8, wherein the restrict sources selectable items further includes a disable shared music selectable item for disabling sharing of music files between computers.

10. A method as recited in claim 8, wherein the selectable locking item disables access to the list of selectable items available for restriction.

11. A method as recited in claim 10, wherein when the list of selectable items available for restriction is disabled, then the list of selectable items available for restriction is visible but grayed out.

12. A method as recited in claim 11, wherein an authorized user can unlock the list of selectable items available for restriction using a password.

13. A method as recited in claim 8, wherein the restrictions apply to the client device.

14. Computer program product including executable computer code tangibly stored thereon for implementing parental controls at a client device, the executable computer code being part of an application program having capability to subscribe to, receive and playback media content from a plurality of media sources, said computer program product comprising:

computer code for displaying a list of selectable program utility items having a selectable parental control item;
   computer code for receiving a first user selection of the selectable parental control item;
   computer code for displaying a list of selectable parental control items available for disablement or restriction;
   computer code for displaying a selectable locking item for disabling unauthorized access to the list of selectable parental control items;
   computer code for receiving a second user selection of one of the selectable parental control items in the list of selectable parental control items, wherein a plurality of the selectable items in the list of selectable parental control items correspond to different media sources, wherein at least one of the media sources pertains to podcasts, and wherein the list of selectable parental control items includes at least a disable podcast selectable item for selectively disabling access to podcasts;
   computer code for distinctively displaying the one of the selectable parental control items in the list of selectable parental control items that the user has selected via the second user selection;
   computer code for receiving a third user selection of the selectable locking item;
   computer code for displaying the list of selectable parental control items being locked in response to the third user selection; and
   computer readable medium for storing the computer code.

15. Computer program product as recited in claim 14, wherein the list of selectable parental control items further includes a disable music store selectable item for disabling access to or viewing of an online music store, and a disable shared music selectable item for disabling sharing of music files between computers.

16. Computer program product as recited in claim 14, wherein the selectable locking item disables access to the list of selectable parental control items.

17. Computer program product as recited in claim 16, wherein when the list of selectable parental control items is disabled, then the list of selectable items available for restriction is visible but grayed out.

18. Computer program product as recited in claim 17, wherein an authorized user can unlock the list of selectable parental control items using a password.

19. Computer program product as recited in claim 14, wherein the restrictions apply to the client device.

20. Computer program product as recited in claim 14, wherein the disable podcast selectable item for selectively disabling access to podcasts operates, when selected, to at least disable reception of podcasts.

21. Computer program product as recited in claim 20, wherein the application program has the further capability to facilitate subscription to podcasts, and wherein if the disable podcast selectable item is selected, then subscription to podcasts via the application program is restricted.

22. A method as recited in claim 8, wherein the disable podcast selectable item for selectively disabling access to podcasts operates, when selected, to at least disable reception of podcasts.

23. A method as recited in claim 8, wherein the application program has the further capability to facilitate subscription to podcasts, and wherein if the disable podcast selectable item is selected, then subscription to podcasts via the application program is restricted.

* * * * *

UNITED STATES PATENT AND TRADEMARK OFFICE
CERTIFICATE OF CORRECTION

| | | |
|---|---|---|
| PATENT NO. | : 7,689,920 B2 | |
| APPLICATION NO. | : 11/221351 | |
| DATED | : March 30, 2010 | |
| INVENTOR(S) | : Jeffrey L. Robbin et al. | |

It is certified that error appears in the above-identified patent and that said Letters Patent is hereby corrected as shown below:

In column 6, line 31, delete "unpurchaseable)" and insert -- unpurchasable) --, therefor.

In column 7, line 21, delete "data" and insert -- data, --, therefor.

In column 7, line 38, delete "decriptors" and insert -- descriptors --, therefor.

Signed and Sealed this
Twenty-ninth Day of November, 2011

David J. Kappos
*Director of the United States Patent and Trademark Office*